Nov. 2, 1965   W. L. SPIELMAN   3,215,616
OZONE-GENERATING AIR PURIFIER
Filed Jan. 2, 1962   2 Sheets-Sheet 1
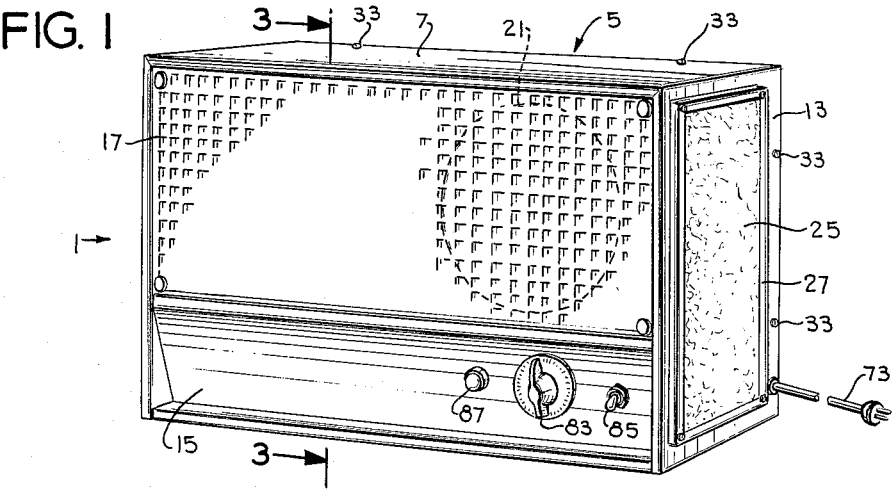
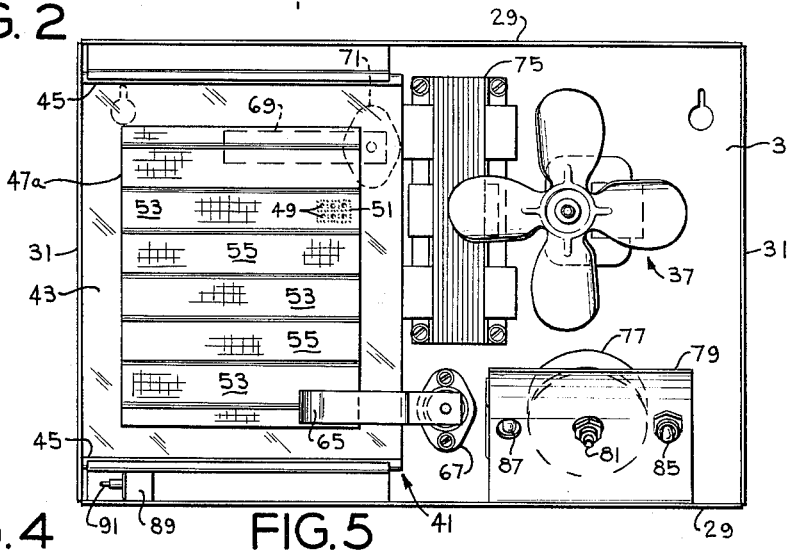
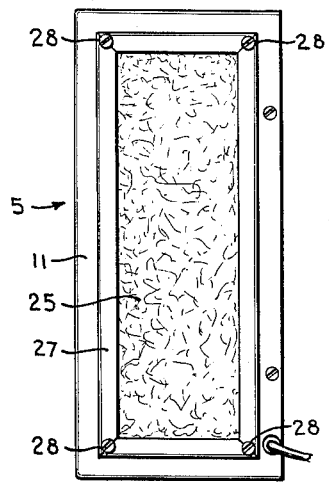
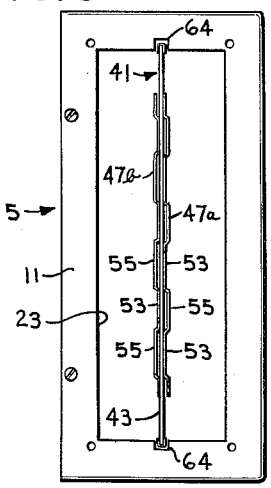
Warren L. Spielman,
Inventor.
Koenig, Pope,
Senniger and Powers,
Attorneys.

Nov. 2, 1965   W. L. SPIELMAN   3,215,616
OZONE-GENERATING AIR PURIFIER
Filed Jan. 2, 1962   2 Sheets-Sheet 2
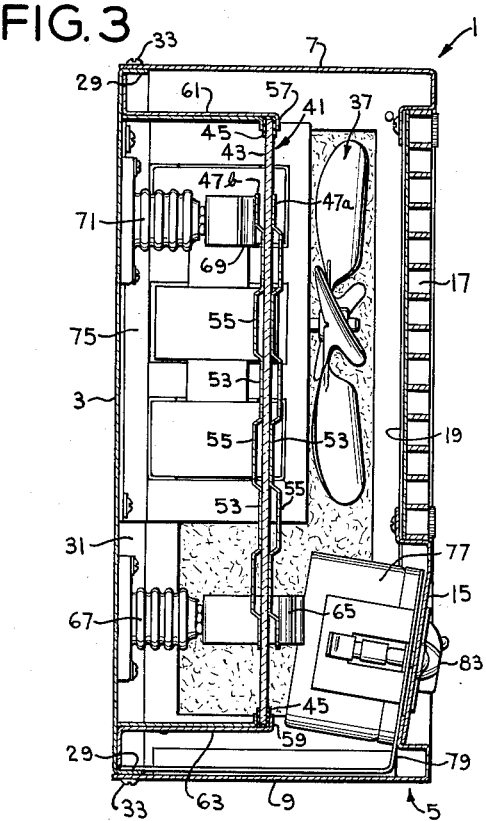
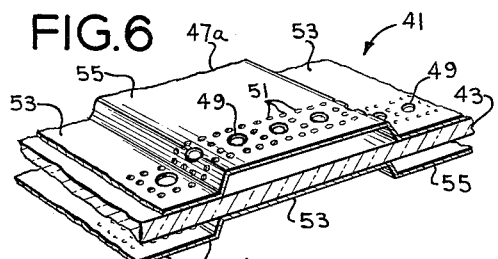
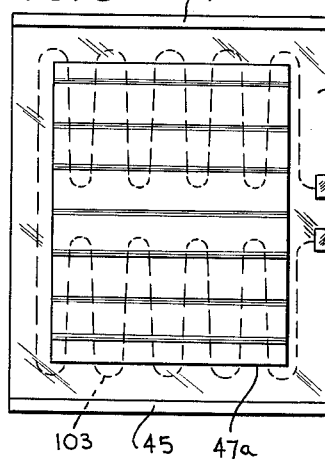
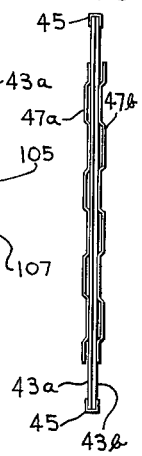
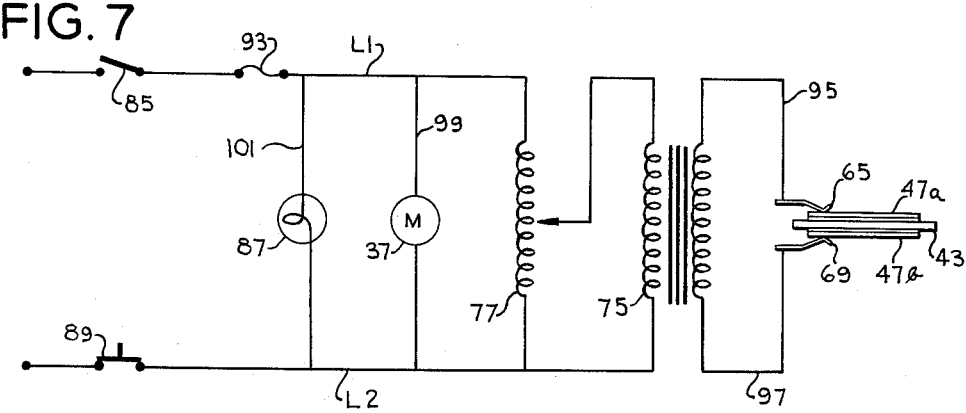

3,215,616
OZONE-GENERATING AIR PURIFIER
Warren L. Spielman, 7301 Overbrook, Normandy, Mo.
Filed Jan. 2, 1962, Ser. No. 163,740
12 Claims. (Cl. 204—313)

This invention relates to air purifiers, more particularly to ozone-generating air purifiers of the type such as used in residences and commercial establishments (restaurants, for example), and to an ozone generator used in such purifiers.

Among the several objects of this invention may be noted the provision of an improved ozone generator, particularly for an air purifier of the class described, having a relatively high capacity for generating ozone using a conventional 110–120 volt 50–60 cycle A.C. current supply within acceptable limits; the provision of an air purifier incorporating one or more ozone generators such as described as to which the generator or generators are readily removable for cleaning; the provision of an ozone generator such as described having heating means associated therewith for air-drying purposes to enable use of the purifier in locations where moist air conditions may be encountered; and the provision of an ozone generator and an air purifier wherein the generator is incorporated which are economical to manufacture.

Other objects atnd features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a perspective of an air purifier embodying the invention;

FIG. 2 is a front elevation of the FIG. 1 air purifier with a casing thereof removed;

FIG. 3 is an enlarged section taken on line 3—3 of FIG. 1;

FIG. 4 is a left end view of FIG. 1;

FIG. 5 is a view similar to FIG. 4 but with an air filter removed;

FIG. 6 is an enlarged fragment in perspective of an ozone generator which is incorporated in the air purifier;

FIG. 7 is a wiring diagram;

FIG. 8 is a view showing a modified ozone generator having heating means incorporated therein; and, FIG. 9 is a view in elevation of FIG. 8.

Corresponding reference characters indicate corresponding parts throughout the several views of the drawings.

Referring to the drawings, there is illustrated an air purifier constructed in accordance with this invention of a type adapted to be mounted on a wall. As shown, this air purifier comprises an enclosure constituted by a cabinet generally designated 1 including a rectangular back panel 3 and a rectangular casing 5. The latter comprises a top wall 7, a bottom wall 9, left and right end walls 11 and 13, an inclined lower front panel 15, and a grille 17 above panel 15. A portion of grille 17 is blocked off by a plate 19 on the inside of the grille, this plate having a circular opening 21 defining an air outlet adjacent the right of the grille.

Each end wall 11 and 13 has a rectangular air inlet opening 23 therein, and a permanent-type air filter 25 is mounted on the outside of each end wall by a bezel 27 removably secured to the end wall by screws 28.

The back panel has forwardly extending flanges 29 at top and bottom and flanges 31 at both ends. Casing 5, which is open at the rear, fits over these flanges and is secured thereto as by screws such as indicated at 33. Keyhole slots 35 are provided in the back panel for mounting it on screws driven into a wall.

Mounted on the front of the back panel 3 adjacent the right end thereof is an electric fan 37 adapted to draw in air through the air inlet openings and filters in the end walls 11 and 13 of the casing 5, and discharge the air through air outlet 21 in plate 19 which backs the grille 17.

At 41 is indicated an ozone generator of this invention, adapted to generate ozone in air drawn in by the fan through the air inlet and filter at the left of the cabinet 1. The ozone-containing stream of air flowing from the generator 41 to the fan mixes with the stream of air flowing to the fan through the air inlet and filter at the right of the cabinet, and the two streams mix and are discharged through outlet 21.

The ozone generator 41 comprises a plate 43 of dielectric material, more particularly glass. As shown, this plate is of rectangular form. It may have portective channel-section strips of plastic or the like such as indicated at 45 adhered to two opposite edges thereof constituting its upper and lower edges as used in the cabinet 1. Secured to opposite faces of the dielectric plate 43 are two electrodes 47a and 47b. Each of these consists of a rectangular plate of perforated corrugated sheet metal, more particularly aluminum. The perforations in the corrugated sheet metal electrodes are indicated at 49 and 51 (see FIG. 6 for an enlarged view showing these perforations). They are provided throughout the area of each electrode. Securement of the electrodes to plate 43 may be effected by means of any suitable adhesive, such as an epoxy resin base adhesive. The surfaces of plate 43 may be roughened for better bond.

As secured to the plate 43, each electrode has depressions 53 contiguous to the respective face of plate 43 and raised portions 55 spaced from plate 43. As appears in FIGS. 3 and 6, the corrugations are wide, shallow and flat, i.e., the width of each corrugation is substantially greater than its depth and each corrugation has a substantially flat base. The electrodes are secured to opposite faces of the plate with their corrugations extending parallel to the upper and lower edges of the plate, and with the corrugations of the electrodes laterally offset relative to one another so that depressions 53 of one electrode register with raised portions 55 of the other.

The ozone generator 41 is removably mounted on the back panel 3 in vertical position parallel to the back panel and spaced forward of the back panel and rearward of the front panel 15 and grille 17 by having the upper and lower edges of the dielectric plate 43 slidably received in opposed guide channels 57 and 59 provided at the outer edges of upper and lower brackets 61 and 63 secured to the back panel. Channel 57 faces downward and channel 59 faces upward. When the filter 25 on the left end wall is removed, the ozone generator 41 may be removed by sliding it toward the left as viewed in FIG. 2 out of channels 57 and 59, notches 64 being provided in the left end wall for this purpose (see FIG. 5). When the ozone generator is slid into the channels, electrode 47a (which is on the front side of plate 43) makes contact with a spring contact finger 65 mounted on an insulator 67 secured to the back panel 3, and electrode 47b makes contact with a spring contact finger 69 mounted on an insulator 71 secured to the back panel.

A power supply cord for supplying the usual 110–120 volt 50–60 cycle A.C. current to the air purifier is indicated at 73. This voltage is stepped up by a step-up transformer 75 under control of a voltage regulator 77 and applied to electrodes 47a and 47b to effect corona discharge from the electrodes for generation of ozone. The arrangement is such as to provide for application of 3500–9000 volts for example, across the electrodes. Step-up transformer 75 is mounted on back panel 3. Regulator 77 which may, for example, be a regulating transformer is mounted on a bracket 79 carried by the back panel. It has a rotatable adjusting shaft 81 which extends through a hole in the inclined lower front panel 15 of casing 5, this shaft having a knob 83 on its outer end. Bracket 79 also carries an On-Off toggle switch 85 and an indicator light 87. The toggle lever of switch 85 extends through a hole in panel 15, and light 87 extends through another hole in panel 15. A safety switch is indicated at 89. The actuator 91 of this switch is engageable by one of the screws 28 securing bezel 27 to the left end wall when casing 5 is in place. When the casing is removed, switch 89 opens.

Referring to FIG. 7, lines L1 and L2 powered from cord 73 are shown. Toggle switch 85 and a fuse 93 are shown as connected in line L1 and safety switch 89 is shown as connected in the other line L2. Lines L1 and L2 supply regulating transformer 77, and the latter supplies the primary of transformer 75. The secondary of transformer 75 is connected to spring contact fingers 65 and 69 as indicated at 95 and 97. The motor of fan 37 and light 87 are connected across lines L1 and L2 as indicated at 99 and 101. The arrangement is such that with ozone generator 41 in place as in FIGS. 2 and 3, in engagement with spring contact fingers 65 and 69, with casing 5 in place so that safety switch 89 is closed, and with switch 85 on, alternating voltage of from 3500–9000 volts, for example, as determined by the setting of knob 83, is applied across the electrodes, and fan 37 is energized. The voltage is such as to produce a corona discharge from the electrodes for generating ozone at a sufficient rate for efficient air purification. With the fan 37 in operation, air is drawn into the cabinet through the air filters at the ends of the cabinet and blown out through outlet 21. The ozone generated by generator 41 mixes with the air flowing in through the filter at the left of the cabinet. Light 47 is energized and signals that the air purifier is in operation. The rate of generation of ozone may be varied to suit conditions by turning knob 83 of the regulating transformer 77.

The perforations in the electrodes 47a and 47b serve a three-fold purpose. First, they provide for better securement by adhesive of the electrodes to plate 43. Second, they provide for better air circulation for better mixture of ozone with the air. Third, the punching of the perforations in the electrodes results in burrs which improve the corona discharge for ozone generation. The ozone generator 41 should be cleaned from time to time, and this may be easily accomplished by removing the filter 25 at the left end of cabinet 1, and sliding the generator out of the cabinet toward the left.

Under conditions where the room air to be purified is moist, it may be desirable to heat the air contacting the ozone generator. This may be accomplished by utilizing an electrical resistance heater in proximity to the generator or by incorporating electrical resistance heating means in the generator. As shown in FIGS. 8 and 9, the latter may be accomplished by making the dielectric plate of the generator of two separate plates 41a and 41b (of glass, for example) laminated together with an electrical resistance heating element 103 therebetween. The latter may be formed, for example, by spraying on one plate a stripe of electrical resistance material in a suitable pattern for overall heating of the generator, and providing terminals as indicated at 105 and 107 for connection of the heating element across lines L1 and L2.

It will be understood that ozone generators such as herein described may be used in air purifiers of different construction than the wall-mounted unit shown herein. For example, they may be used in a ceiling-mounted unit, or a table model unit. Or they may be used in air conditioning or ventilating ductwork. In each case, the arrangement may be comparable to that described above for permitting ready removal of the generator or generators used in the installation for cleaning.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An ozone generator comprising a flat plate of dielectric material and corona-discharge electrodes secured to opposite faces of the plate, each electrode comprising a piece of sheet metal which is corrugated so as to have depressions contiguous to the respective face of the plate and raised portions spaced from the plate, each depression and each raised portion being of equal dimensions and substantially flat and parallel to the plate throughout its respective area, said electrodes being secured to opposite faces of the plate with the corrugations of one electrode offset relative to the corrugations of the other so that the depressions of one electrode register with the raised portions of the other.

2. An ozone generator as set forth in claims 1 wherein said plate comprises two individual dielectric plates secured together flatwise with electrical resistance heating means therebetween.

3. An ozone generator as set forth in claim 2 wherein said electrical resistance heating means comprises a stripe of electrical resistance material coated on one of said plates to provide overall heating of the generator, and terminals extending from between the plates at the ends of the stripe.

4. Air purifying means comprising a structure through which air may flow, and an ozone generator in said structure comprising a single flat plate of dielectric material positioned generally in the direction of air flow and having corona-discharge electrodes on opposite faces thereof, each electrode comprising a piece of sheet metal which is corrugated so as to have depressions contiguous to the respective face of said plate and raised portions spaced from said plate, each depression and each raised portion being of equal dimensions and substantially flat and parallel to the plate throughout its respective area, each electrode having a multiplicity of perforations therein, said electrodes being secured to opposite faces of the plate with the corrugations of one electrode offset relative to the corrugations of the other so that the depressions of one electrode register with the raised portions of the other.

5. Air purifying means as set forth in claim 4 wherein said generator is mounted for removal from within said structure.

6. Air purifying means as set forth in claim 5 wherein said generator is removably mounted by means comprising a pair of guides in the structure in which two opposite edges of said plate are slidably received, said generator being removable by sliding it out of said guides.

7. Air purifying means as set forth in claim 6 including contacts in said structure engageable with said electrodes when said generator is in place in said structure, said electrodes being disengageable from said contacts when said generator is slid out of said guides.

8. An air purifier comprising a cabinet having an air inlet and an air outlet, means in the cabinet for drawing air in through the inlet and discharging it through the outlet, and an ozone generator in the cabinet comprising a flat plate of dielectric material positioned generally in the direction of air flow and having corona-discharge electrodes on opposite faces thereof, each electrode comprising a piece of metal which is corrugated so as to have depressions contiguous to the respective face of said plate and raised portions spaced therefrom, the width of each corrugation being substantially greater than its depth, each depression and each raised portion being of equal dimensions and substantially flat and parallel to the plate throughout its respective area, each electrode having a multiplicity of perforations therein, said electrodes being secured to opposite faces of the plate with the corrugations of one electrode offset relative to the corrugations of the other so that the depressions of one electrode register with the raised portions of the other.

9. An air purifier as set forth in claim 8 wherein said generator is mounted for removal through said inlet.

10. An air purifier as set forth in claim 9 wherein said generator is removably mounted by means comprising a pair of guides in said cabinet in which two opposite edges of said plate are slidably received, said generator being removable through said inlet by sliding it out of said channels.

11. An air purifier as set forth in claim 10 including contacts in said cabinet engageable with said electrodes when said generator is in place in the cabinet, said electrodes being disengageable from said contacts when said generator is slid out of said guides.

12. An ozone generator as set forth in claim 1 wherein each electrode consists of corrugated sheet aluminum having a multiplicity of perforations therein, said depressions having substantially the same area as said raised portions.

References Cited by the Examiner
UNITED STATES PATENTS

| | | | |
|---|---|---|---|
| 2,125,672 | 8/38 | Garrett | 204—318 |
| 2,744,865 | 5/56 | Penning | 204—322 |
| 2,842,491 | 7/58 | Toader | 204—317 |

FOREIGN PATENTS

| | | |
|---|---|---|
| 585,666 | 10/33 | Germany. |
| 6,872 | 11/05 | Great Britain. |

JOHN H. MACK, *Primary Examiner.*
JOHN R. SPECK, *Examiner.*